(12) United States Patent
Tang et al.

(10) Patent No.: US 11,978,148 B2
(45) Date of Patent: May 7, 2024

(54) THREE-DIMENSIONAL IMAGE PLAYER CAPABLE OF REAL-TIME INTERACTION

(71) Applicant: IDEAPOOL TECHNOLOGY CO., LTD., Beijing (CN)

(72) Inventors: Xingbo Tang, Beijing (CN); Yu He, Beijing (CN)

(73) Assignee: IDEAPOOL TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/926,686

(22) PCT Filed: Mar. 10, 2021

(86) PCT No.: PCT/CN2021/080031
§ 371 (c)(1),
(2) Date: Nov. 21, 2022

(87) PCT Pub. No.: WO2022/183519
PCT Pub. Date: Sep. 9, 2022

(65) Prior Publication Data
US 2023/0196652 A1    Jun. 22, 2023

(30) Foreign Application Priority Data
Mar. 5, 2021   (CN) .......................... 202110254266.9

(51) Int. Cl.
*G06T 15/00* (2011.01)
*G06T 13/20* (2011.01)
*G06T 17/00* (2006.01)

(52) U.S. Cl.
CPC ............ *G06T 15/005* (2013.01); *G06T 13/20* (2013.01); *G06T 17/00* (2013.01); *G06T 2200/24* (2013.01); *G06T 2210/52* (2013.01)

(58) Field of Classification Search
None
See application file for complete search history.

(56) References Cited

U.S. PATENT DOCUMENTS

2007/0159488 A1* 7/2007 Danskin ................. G09G 5/363
                                                             345/505
2009/0251478 A1   10/2009 Maillot et al.

FOREIGN PATENT DOCUMENTS

CN           102789348 A       11/2012
CN           105354872 A        2/2016
(Continued)

OTHER PUBLICATIONS

Max Limper, Maik Thoner, Johannes Behr, Dieter W. Fellner, "SRC—A Streamable Format for Generalized Web-based 3D Data Transmission", Aug. 10, 2014, ACM, Web3D '14: Proceedings of the 19th International ACM Conference on 3D Web Technologies, pp. 35-43.*

(Continued)

*Primary Examiner* — Robert Bader
(74) *Attorney, Agent, or Firm* — Schmeiser, Olsen & Watts, LLP (57) ABSTRACT

A three-dimensional image player capable of real-time interaction is provided, including: a material management module, a rendering control module, an interaction control module, and a display control module; the material management module further includes an attribute parsing module for performing classification parsing on materials, the hardware environment, and the operating platform; the three-dimensional image player capable of real-time interaction, may use smart engine matching technology to match three-dimensional image of different formats and types with different engines, to realize the whole process capability of importing, rendering engine intelligent matching, loading, previewing, and interacting, and also it supports unique interactive experiences such as previewing, clicking, and effect presenting of three-dimensional image with interactive capabilities.

6 Claims, 5 Drawing Sheets

(56) References Cited

FOREIGN PATENT DOCUMENTS

| | | |
|---|---|---|
| CN | 107027075 A | 8/2017 |
| CN | 109147022 A | 1/2019 |
| CN | 109493431 A | 3/2019 |
| CN | 109978983 A | 7/2019 |
| CN | 110599576 A | 12/2019 |

OTHER PUBLICATIONS

International Search Report dated Nov. 30, 2021 for PCT/CN2021/080031.

* cited by examiner

| Basic features section | | | | | Extended feature section | | | |
|---|---|---|---|---|---|---|---|---|
| File format of the material | Complexity of the material | Application scene of the material | Hardware environment | Platform Type | | | | |

FIG. 6

THREE-DIMENSIONAL IMAGE PLAYER CAPABLE OF REAL-TIME INTERACTION

CROSS-REFERENCE TO RELATED APPLICATIONS

This application claims priority to PCT Application No. PCT/CN2021/080031, having a filing date of Mar. 10, 2021, which claims priority to CN Application No. 202110254266.9, having a filing date of Mar. 5, 2021, the entire contents of both of which are hereby incorporated by reference.

FIELD OF TECHNOLOGY

The following relates to the technical field of real-time processing of three-dimensional images and video playback, and specifically to three-dimensional image player capable of real-time interaction.

BACKGROUND

With the continuous progress of image and virtual reality technology, the demand for three-dimensional data visualization is increasing, and more and more scenes need to be modeled in three-dimensional, many industries and users will have three-dimensional scenes or three-dimensional models for trading and use, and there are many three-dimensional rendering engines on the market, each engine is different in rendering capacity, packaging, support environment, etc. It is difficult for users to preview and interact with models and scenes rendered by different engines through a unified platform, which makes it difficult for users to choose to buy models and scenes.

In the existing usage scene, when browsing a three-dimensional model or scene on a web page, it can only be browsed by means of screenshots, videos, etc. Some platforms using WebGL can present the model on the web side, for example, patent application 201710388818.9 discloses an online video player based on a web platform, providing an online video player based on a web platform, which can upload editing data after online editing to achieve the same synthetic video effect as that using AE and other video editing software, which can greatly accelerate the process of synthetic video. But the main technical defects that the patent overcomes is: online video field, teaching or instructing content of the video with picture content, needing to post-process picture (such as sheet music) through the video editing software (such as AE and other video editing software) to the video content, and then you can watch the video content and picture synchronization effect of the film on the internet, which is a very tedious and troublesome process. The presentation method or player used in the online video player of the patent application is also all using traditional display technology, in which the display interface of the image or three-dimensional model for a simple display, but cannot realize the 360-degree preview and zoom when browsing, moreover, cannot realize the image or three-dimensional model in the preview at the same time, in its internal real-time interactive operation, therefore, the user can only preview the model or scene and the interaction method in a not very intuitive way, and cannot fully understand the real situation of the selected model or scene before purchasing with will easily cause misjudgment and economic loss.

In addition, the current industry for different three-dimensional modeling software and model presentation effect, the need to use different engines for model rendering and previewing. Most of the three-dimensional model websites or content providers can only provide three-dimensional model previews in the form of screenshots and videos, and a few provide WebGL-based three-dimensional model preview tools, but they are limited to drag and drop, rotation, scaling and other operations. For same unique three-dimensional models with node effects, so far, there is no three-dimensional model player in the industry market that supports rendering, previewing and interaction capabilities.

SUMMARY

An aspect relates to a real-time interactive three-dimensional image player, aiming at matching different engines for rendering three-dimensional images of different formats and types through intelligent engine matching technology, and realizing the whole process capability of importing, rendering engine intelligent matching, loading, previewing, and interacting of three-dimensional images; at the same time, supporting some unique interactive experiences such as previewing, clicking and effect rendering of three-dimensional images.

Embodiments of the present invention refer to a real-time interactive three-dimensional image player, comprising: a material management module, a rendering control module, an interaction control module and a display control module, wherein:

the material management module, which is connected to the rendering control module, by using the local file manager, to single or batch import the local material which meeting the requirements to the rendering control module; or by entering the download address of the network material (the CDN address), the material being first downloaded and then imported to the rendering control module;

the rendering control module, which is connected to the material management module and the interaction control module, respectively, for managing the invocation of the rendering engine, performing real-time rendering operations on the material imported by the material management module and on the material after the interactive operation implemented by the interaction control module, and then outputting the rendered material to the interaction control module;

the interaction control module, which is connected to the rendering control module and the display control module, respectively, for receiving interaction commands to control the interactive operation of rendered material from the rendering control module, or to output the rendered material to the display control module if no interactive operation is required;

the display control module, which is connected to the interaction control module for loading, displaying and previewing the rendered material.

In addition, the material management module includes an attribute parsing module, for classifying and analyzing the imported material, the hardware environment and the operating platform, to generate an attribute tag corresponding to the imported material which is encapsulated with the imported material in a material file, the material file always has the attribute tag.

The attribute tag includes a basic feature portion and an extended feature portion, which the basic feature section includes at least five basic feature fields, being the file format of the material, the complexity of the material, the application scenario of the material, the hardware environment and the platform type; the extended feature section field is used for functional expansion.

Optionally, the rendering control module includes a rendering engine scheduling management module for managing and scheduling the rendering engines, to accomplish independent rendering of the material file by a single rendering engine and parallel batch rendering of the material file by plurality of rendering engines.

The rendering engine scheduling management module performs a rendering engine scheduling method based on the attribute tags to manage and invoke plurality of local or cloud-based rendering engines, the rendering engine scheduling method includes the following steps:

- extracting an attribute tag, extracting the attribute tag from the material file;
- parsing material attributes, reading field data in the attribute tag and performing logical operations on the field data to obtain material attribute data;
- determining a solution for scheduling the rendering engine, generating a rendering engine invocation command label based on the material attribute data;
- invoking rendering engines, according to the rendering engine invoke command labels, managing the invocation of single or plurality of rendering engines to implement rendering operations on the material file.

Wherein the complexity of the material is determined by the number of points, lines, planes of a model in the material, texture information of the model, the number of objects in the model and rendering accuracy of the object.

Based on the application scene of embodiments of the present invention, the interaction control module is capable of three types of basic interactive operations:

- the first type of interactive operation, controlling the interaction with the scene interface;
- the second type of interactive operation, controlling the interactive operation on some of the public attributes in the scene;
- the third type of interactive operation, controlling the interactive operation on nodes contained in the scene.

For the above basic interactive operations, the interaction control module performs the main interaction control method for the interactive operation, including following steps:

- determining the type of interactive operation, receiving and analyzing interaction commands and determining the type of basic interactive operation;
- performing the interactive operation, based on the determined the type of interactive operation, performing a corresponding interactive operation on the material file been rendered by the rendering control module to generate the interacted material;
- modifying the attribute tag, based on the performed interactive operation, modifying the attribute tag of the interacted material file and generating a new attribute tag;
- outputting the result of the interactive operation, and outputting the interacted material file to the rendering control module for performing the rendering.

In addition, for the third type of interactive operation mentioned above, embodiments of the present invention proposes a sub-interaction control method in the following steps:

- three-dimensional modeling, using the three-dimensional modeling plug-in integrated with the player to model the material in three-dimensional and generate a three-dimensional model;
- animation producing, importing the built three-dimensional model into the animation producing plug-in integrated in the player for animation producing, generating an animation template;
- node editing, editing of the node content of the animation template so that it can support touching broadcast or other type of controlling the broadcast;
- defining a button node, defining a button node in the animation template to form a trigger mechanism for controlling the three-dimensional model in the animation template can be broadcasted in three-dimensional animation in accordance with the content of the node.

By using and implementing the above technical solutions, embodiments of the present invention can unify the current mainstream three-dimensional rendering engines for unified management and invocation, and is compatible with most of the mainstream modeling tools, scene editing tools, blueprinting tools and interaction design tools in one product, and adapts to almost all three-dimensional rendering engines, so that users can quickly preview the state of models, scenes and interaction logic without installing attached runtime libraries and engine underlays, providing a more convenient means of model shopping, subsequent production and user delivery.

Since embodiments of the present invention can real-time interactive three-dimensional image player integrates multi-core rendering engine, internally, it can be widely used in the development of three-dimensional graphic creation, rendering and broadcast control system in traditional fields of broadcasting media, data visualization, education industry research and development, to meet the needs of various TV programs for three-dimensional graphic packaging effect, such as live news broadcast, sports broadcast, financial broadcast, weather forecast, entertainment variety, traffic road conditions and other types of live broadcast, media large screen broadcast, data visualization output and other needs; embodiments of the present invention of the three-dimensional image player capable of real-time interaction can also be applied in such as three-dimensional video games, architectural visualization, real-time three-dimensional animation and other types of interactive content of multi-platform comprehensive game development tools. The player of embodiments of the present invention is simple to transplant different development platforms, has good cross-platform characteristics, and can be easily and rapidly applied on mainstream systems such as Android and IOS.

In addition, the player of embodiments of the present invention not only enables one-click rendering and previewing of models and templates of plurality of rendering engines, but also provides professional-level editing and modification functions, which facilitates users to quickly open and edit corresponding three-dimensional scenes without learning complicated scene creation tools.

BRIEF DESCRIPTION

Some of the embodiments will be described in detail, with references to the following Figures, wherein like designations denote like members, wherein.

DETAILED DESCRIPTION

Figure 1:
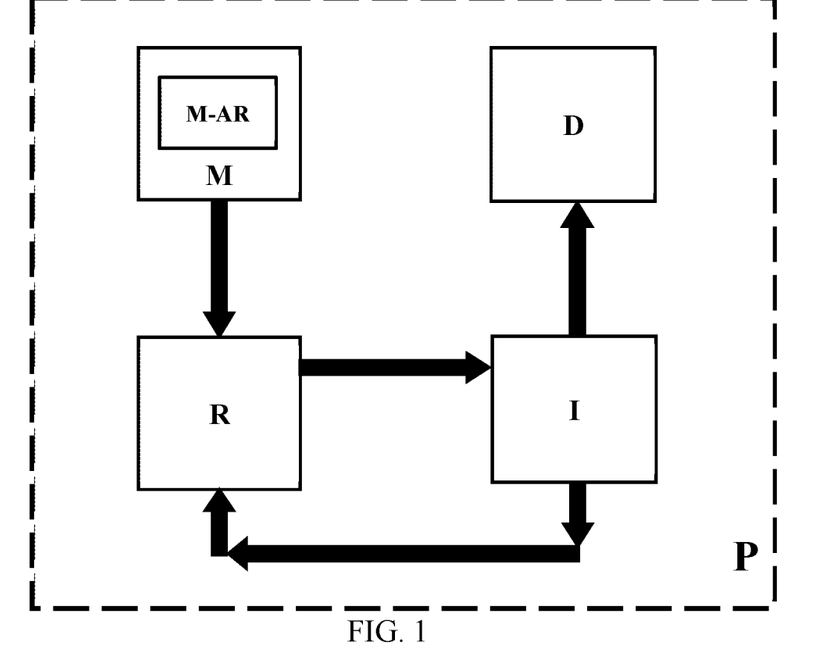
FIG. 1 is a schematic diagram of a structure of the three-dimensional image player capable of real-time interaction according to the first embodiment of the present invention.

FIG. 1 shows a three-dimensional image player capable of real-time interaction P of the first embodiment of the present invention includes: a material management module M, a rendering control module R, an interaction control module I, and a display control module D, wherein:

the material management module, which is connected to the rendering control module, by using the local file manager, to single or batch import the local material which meeting the requirements to the rendering control module; or by entering the download address of the network material (the CDN address), the material being first downloaded and then imported to the rendering control module;

the rendering control module, which is connected to the material management module and the interaction control module, respectively, for managing the invocation of the rendering engine, performing real-time rendering operations on the material imported by the material management module and on the material after the interactive operation implemented by the interaction control module, and then outputting the rendered material to the interaction control module;

the interaction control module, which is connected to the rendering control module and the display control module, respectively, for receiving interaction commands to control the interactive operation of rendered material from the rendering control module, or to output the rendered material to the display control module if no interactive operation is required;

the display control module, which is connected to the interaction control module for loading, displaying and previewing the rendered material.

Optionally, the material management module of embodiments of the present invention further includes an attribute parsing module R-DM, this attribute resolution module R-DM is used for classifying and analyzing the imported material, the hardware environment and the operating platform, to generate an attribute tag C-Tag corresponding to the imported material which is encapsulated with the imported material in a material file, the material file always has the attribute tag C-Tag.

Figure 6:
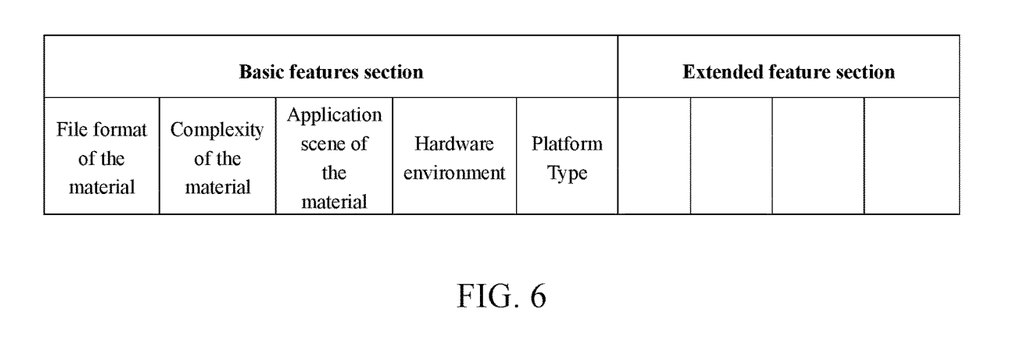
FIG. 6 is a schematic diagram of the structure of the attribute tags generated and used in the three-dimensional image player capable of real-time interaction according to the first and second embodiments of the present invention.

The attribute tag C-Tag includes a basic feature portion and an extended feature portion, which the basic feature section includes at least five basic feature fields, being the file format of the material, the complexity of the material, the application scenario of the material, the hardware environment and the platform type; the extended feature section field is used for functional expansion.

Figure 2:
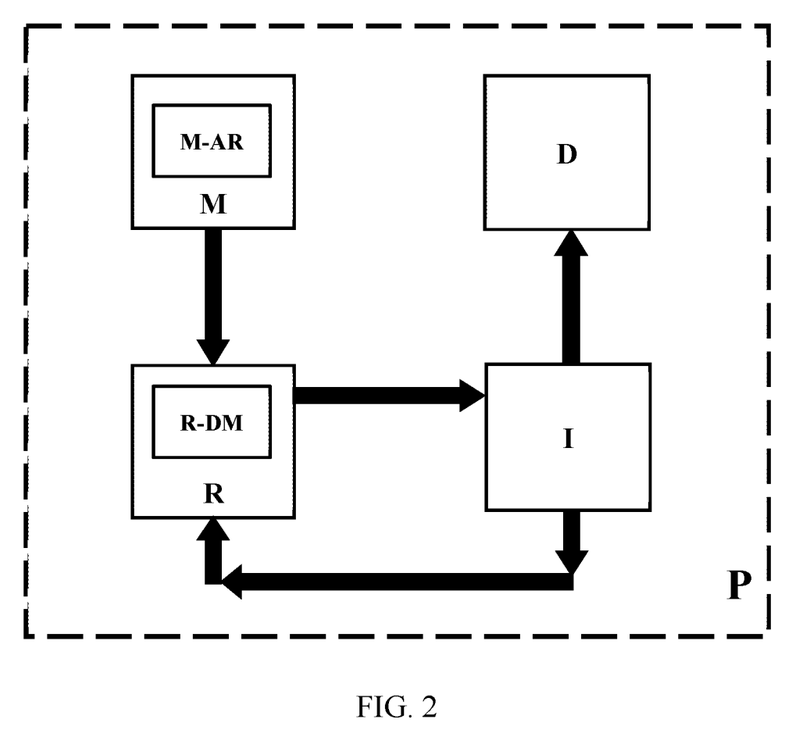
FIG. 2 is a schematic diagram of the structure of the three-dimensional image player capable of real-time interaction according to the second embodiment of the present invention.

FIG. 2 shows a schematic diagram of the structure of the real-time interaction three-dimensional image player P according to the second embodiment of the present invention. Wherein the rendering control module R includes a rendering engine scheduling the management module R-DM for managing and scheduling the rendering engines, to accomplish independent rendering of the material file by a single rendering engine and parallel batch rendering of the material file by plurality of rendering engines.

Figure 3:
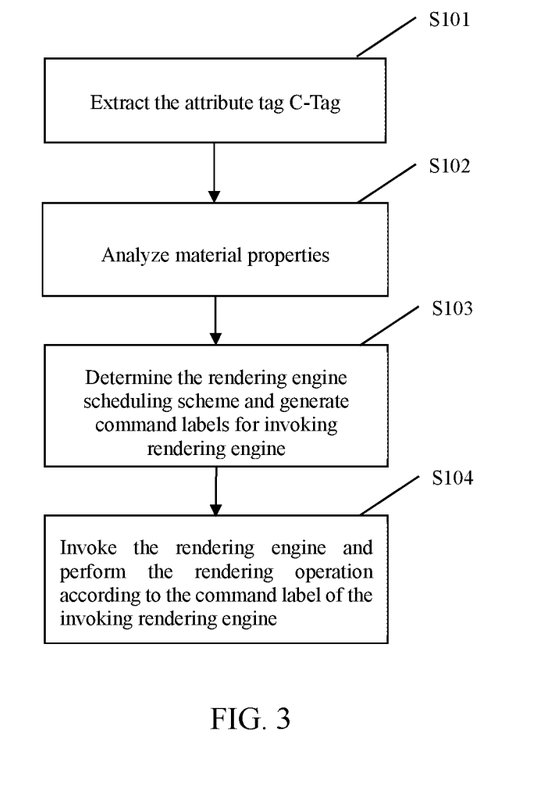
FIG. 3 is a schematic diagram of a rendering engine scheduling method processing flow executed by a rendering control module of the three-dimensional image player capable of real-time interaction according to the second embodiment of the present invention.

FIG. 3 shows a schematic diagram of a rendering engine scheduling method processing flow executed by a rendering control module of the three-dimensional image player capable of real-time interaction P according to the second embodiment of the present invention. The rendering engine scheduling management module R-DM performs a rendering engine scheduling method based on the attribute tag C-Tag to manage and invoke plurality of local or cloud-based rendering engines, the rendering engine scheduling method includes the following steps:

S101, extracting an attribute tag C-Tag, extracting the attribute tag C-Tag from the material file;

S102, parsing material attributes, reading field data in the attribute tag C-Tag and performing logical operations on the field data to obtain material attribute data;

S103, determining a solution for scheduling the rendering engine, generating a rendering engine invocation command label based on the material attribute data;

S104, invoking the rendering engine, according to the rendering engine invocations command label, managing the invocation of single or plurality of rendering engines to implement rendering operations on the material file.

Wherein the complexity of the material is determined by the number of points, lines, planes of a model in the material, texture information of the model, the number of objects in the model and rendering accuracy of the object.

In the above rendering engine scheduling method, the rendering engine scheduling management module R-DM performs method of corresponding rendering engine scheduling management, in this way, when the three-dimensional image player P capable of real-time interaction of embodiments of the present invention opens a model file, it automatically determines type of material, complexity, application occasion, and current hardware resource platform type, etc. to intelligently judgment. For example, if model format belongs to media, education, medical virtual reality, virtual augmentation application, three-dimensional information visualization type, scheduling and using IDPRE engine kernel to open; if it belongs to game, entertainment, architecture and virtual reality visualization application, scheduling and using UE engine kernel to open; if it belongs to light weight, mobile game, entertainment, scheduling and using Unity engine kernel processing; if the hardware platform is weak, IDPRE/Unity engine kernel will be used first; if the hardware platform is strong, UE engine kernel will be used first; if the quality of rendering screen is given priority, UE engine kernel will be dispatched; if the speed is given priority, IDPRE/Unity engine will be dispatched first; if it is a common three-dimensional model file, IDPRE will be used first to open it, if it is a platform-specific file, it is scheduled to be opened using Unity, UE and other engine kernels. By performing a rendering engine scheduling management method through the rendering engine scheduling management module, the three-dimensional image player P capable of real-time interaction of embodiments of the present invention can automatically make intelligent judgments on how to perform rendering operations based on multi-layers and multi-dimensions of the material specifics, thus using lowest hardware resources and taking into account highest processing efficiency to open, browse and interact with various three-dimensional material files with maximum compatibility.

In addition, based on the application scene of embodiments of the present invention, the interaction control module I is capable of three types of basic interactive operations:

the first type of interactive operation, controlling the interaction with the scene interface;

the second type of interactive operation, controlling the interactive operation on some of the public attributes in the scene;

the third type of interactive operation, controlling the interactive operation on nodes contained in the scene.

Figure 4:
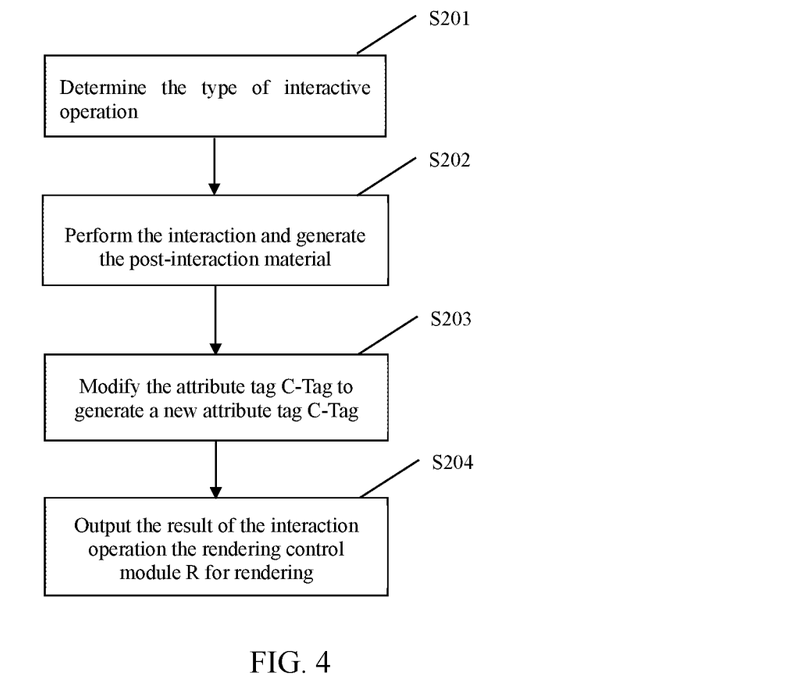
FIG. 4 is a schematic diagram of the processing flow of the main interaction control method executed by the interaction control module of the three-dimensional image player capable of real-time interaction according to the first and second embodiments of the present invention.

FIG. 4 shows a schematic diagram of the processing flow of the main interaction control method performed by the interaction control module I of the three-dimensional image player capable of real-time interaction P according to the first and second embodiments of the present invention. For the above basic interactive operations, the interaction control module performs the main interaction control method for the interactive operation, in the following steps:

S201, determining the type of interactive operation, receiving and analyzing interaction commands and determining the type of basic interactive operation;

S202, performing the interactive operation, based on the determined the type of interactive operation, performing a corresponding interactive operation on the material file been rendered by the rendering control module to generate the interacted material;

S203, modifying the attribute tag, based on the performed interactive operation, modifying the attribute tag of the interacted material file and generating a new attribute tag;

S204, outputting the result of the interactive operation, and outputting the interacted material file to the rendering control module for performing the rendering.

Figure 5:
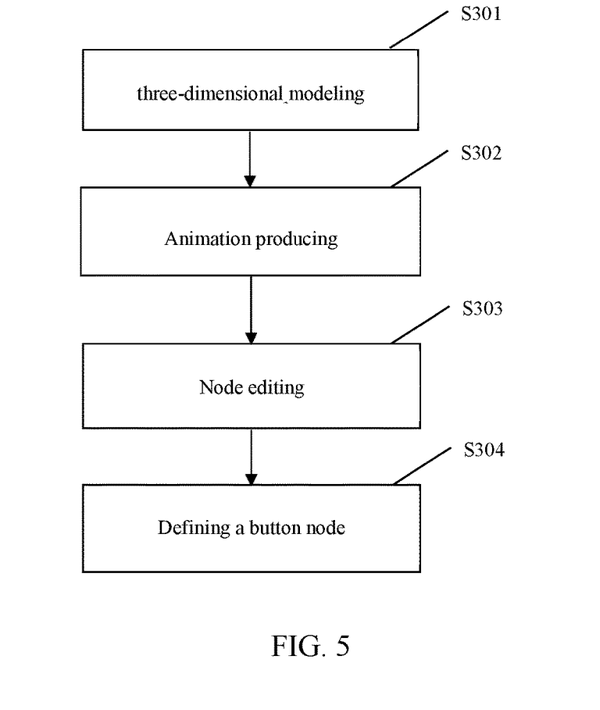
FIG. 5 is a schematic diagram of the processing flow of a sub-interaction control method performed by an interaction control module of the three-dimensional image player capable of real-time interaction according to the first and second embodiments of the present invention.

FIG. 5 shows a schematic diagram of the processing flow of the sub-interaction control method executed by the interaction control module I of the three-dimensional image player capable of real-time interaction P according to the first and second embodiments of the present invention, for the third type of interactive operation mentioned above, embodiments of the present invention propose a sub-interaction control method in the following steps:

S301, three-dimensional modeling, invoking the three-dimensional modeling plug-in integrated with the player to model the material in three-dimensional and generate a three-dimensional model;

S302, animation producing, importing the built three-dimensional model into the player-integrated animation producing plug-in for animation producing, generating an animation template;

S303, node editing, editing of the node content of the animation template so that it can support touch broadcast or other control of the broadcast;

S304, defining a button node, defining a button node in the animation template to form a trigger mechanism for controlling that the three-dimensional model in the animation template can be three-dimensional animated in accordance with the content of the node.

The following is a detailed explanation of the sub-interaction control method for the third type of interaction operation described above, in conjunction with the interaction with a car model, in the following steps:

i. first, the modeling of a car in the three-dimensional modeling software, modeling should include not only the subject structure of a car, but also the modeling of a main internal components, such as an engine, suspension, gearbox, water tank, mailbox, transmission system, brake system, tires, wheel hubs, and other components;

ii. importing the built three-dimensional model into the animation producing software, animation producing, including a car body decomposition animation, animation of a complete car decomposition into the state of each component; car synthesis animation, scattered parts combined into a complete car animation;

iii. editing this template for node content so that it can support touch broadcasting or other control of broadcasting;

iv. adding a button node to the whole car to make it a whole trigger content, and the click command of this button is used to control the broadcast of a car decomposition animation, as follows:

1. adding free rotation nodes to objects such as the engine, suspension, gearbox, water tank, fuel tank, transmission system, bake system, tires, wheel hubs, etc., so that each object can be rotated for operation;

2. adding further movement nodes to objects such as engine, suspension, gearbox, water tank, fuel tank, transmission system, brake system, tires, wheel hubs, etc., so that each object is freely movable;

3. adding further scaling nodes to objects such as engine, suspension, gearbox, water tank, fuel tank, transmission system, brake system, tires, wheel hubs, etc., so that each object can support free scaling operations;

4. adding a blank hot zone, adding it as a button node, and using the click command of this button to control the broadcast of the composite animation of the car body;

5. creating an animation for each object such as engine, suspension, gearbox, water tank, fuel tank, transmission system, brake system, tires, wheel hubs, etc., creating an animation that pops up a text version of introduction;

6. adding a button node for each object such as engine, suspension, gearbox, water tank, fuel tank transmission system, brake system, tires, wheel hubs, etc., using the click of this button to trigger the animation of the corresponding introductory text version, and clicking again to trigger animation of text version retraction.

After the above steps are completed, the scene file is loaded and opened in the player, and then the interactive control of the nodes can be realized. By clicking on car body, the decomposition animation of car body is broadcasted, and each part can be freely rotated, scaled and moved, and clicking on each part will also trigger animation broadcast of introduction version text.

Embodiments of the present invention can unify current mainstream three-dimensional rendering engine for management and invocation, and are compatible with most of mainstream modeling tools, scene editing tools, blueprint drawing tools, and interaction design tools in one product, adapting to almost all three-dimensional rendering engine, and users can quickly preview the state of the model, scene and interaction logic without installing the attached runtime library and engine base layer, it provides a more convenient means for users to purchase models, subsequent production, and user delivery.

In addition, due to the internal integration of multi-core rendering engine and the corresponding scheduling management module and scheduling management method, the three-dimensional image player P capable of real-time interaction of embodiments of the present invention can be widely used in traditional media fields such as broadcasting media, data visualization, education industry R&D, entertainment and variety arts, but also in such types of interactive contents as three-dimensional video games, architectural visualization, real-time three-dimensional animation, etc., in the field of multi-platform comprehensive game development. In addition, the three-dimensional image player P capable of real-time interaction of embodiments of the present invention is simple to transplant for different development platforms, has good cross-platform characteristics, and can be easily and quickly applied on mainstream systems such as Android and iOS.

In addition, the player of embodiments of the present invention can not only realize one-click rendering and preview of models and templates of plurality of rendering engines, but also provide professional-level editing and modification functions, which facilitate users to quickly open and edit corresponding three-dimensional scenes without learning complicated scene creation tools.

Although the invention has been illustrated and described in greater detail with reference to the exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A three-dimensional image player capable of real-time interaction, the three-dimensional image player comprising:
   a material management module, a rendering control module, an interaction control module, and a display control module, wherein:
      the material management module, which is connected to the rendering control module, by using a local file manager, to single or batch import a local material which meeting requirements to the rendering control module; or by entering a download address of a network material, which is a CDN address, the network material being first downloaded and then imported to the rendering control module; the rendering control module, which is connected to the material management module and the interaction control module respectively, for managing an invocation of one or more rendering engines, performing real-time rendering operations on the material imported by the material management module and on the material after an interactive operation implemented by the interaction control module, and then outputting the rendered material to the interaction control module; the interaction control module, which is connected to the rendering control module and the display control module respectively, for receiving interaction commands to control the interactive operation of rendered material from the rendering control module, or to output the rendered material to the display control module if no interactive operation is required; the display control module, which is connected to the interaction control module, for loading, displaying and previewing the rendered material; and the material management module includes an attribute parsing module, for classifying and analyzing the imported material, a hardware environment and an operating platform, to generate an attribute tag corresponding to the imported material which is encapsulated with the imported material in a material file, the material file always has an attribute tag;
   wherein, the attribute tag includes a basic feature portion and an extended feature portion, which the basic feature section includes at least five basic feature fields, including a file format of the material, a complexity of the material, an application scenario of the material, the hardware environment and the platform type; and the extended feature section field is used for functional expansion;
   wherein the complexity of the material is determined by the number of points, lines, and planes of a model in the material, texture information of the model, the number of objects in the model and rendering accuracy of the object.

2. The player according to claim 1, wherein, the rendering control module comprises a rendering engine scheduling management module for managing and scheduling the one or more rendering engines, to accomplish independent rendering of the material file by a single rendering engine and parallel batch rendering of the material files by plurality of rendering engines.

3. The player according to claim 2, wherein the rendering engine scheduling management module performs a rendering engine scheduling method based on the attribute tag to manage and invoke plurality of local or cloud-based rendering engines, the rendering engine scheduling method includes the following:
   extracting an attribute tag, extracting the attribute tag from the material file;
   parsing material attributes, reading field data in the attribute tag and performing logical operations on the field data to obtain material attribute data;
   determining a solution for scheduling the rendering engine, generating a rendering engine invocation command label based on the material attribute data; and
   invoking the rendering engine, according to the rendering engine invocation command label, managing the invocation of single or plurality of rendering engines to implement rendering operations on the material file.

4. A player according to claim 1, wherein the interaction control module is capable of three types of basic interactive operations,
   a first type of interactive operation, controlling an interaction to a scene interface;
   a second type of interactive operation, controlling the interactive operation on some public attributes in a scene; and
   a third type of interactive operation, controlling the interactive operation on nodes contained in the scene.

5. A player according to claim 4, wherein the interaction control module performs the main interaction control method for the interactive operation, including following:
   determining a type of interactive operation, receiving and analyzing interaction command and determining a type of basic interactive operation;
   performing the interactive operation, based on the determined the type of interactive operation, performing a corresponding interactive operation on the material file been rendered by the rendering control module to generate the interacted material;

modifying the attribute tag, based on the performed interactive operation, modifying the attribute tag of the interacted material file and generating a Previously Presented attribute tag; and outputting the result of the interaction operation, outputting the interacted material file to the rendering control module for performing the rendering.

6. A player according to claim 4, wherein, when the interaction control module implementing the third type of interactive operation according to the interaction command, a sub-interaction control method is executed, in the following:

three-dimensional modeling, using the three-dimensional modeling plug-in integrated in the player to model the material in three-dimensional and generating a three-dimensional model;

animation producing, importing the built three-dimensional model into an animation production plug-in integrated in the player for animation producing, generating an animation template;

editing of a node content of the animation template to support touching broadcast or other type of controlling broadcast; and defining a button node, defining a button node in the animation template to form a trigger mechanism for controlling the three-dimensional model in the animation template can be broadcasted in three-dimensional animation in accordance with the content of the node.

* * * * *